(No Model.)
W. ANDREWS.
HORSE HAY FORK.
No. 253,657. Patented Feb. 14, 1882.
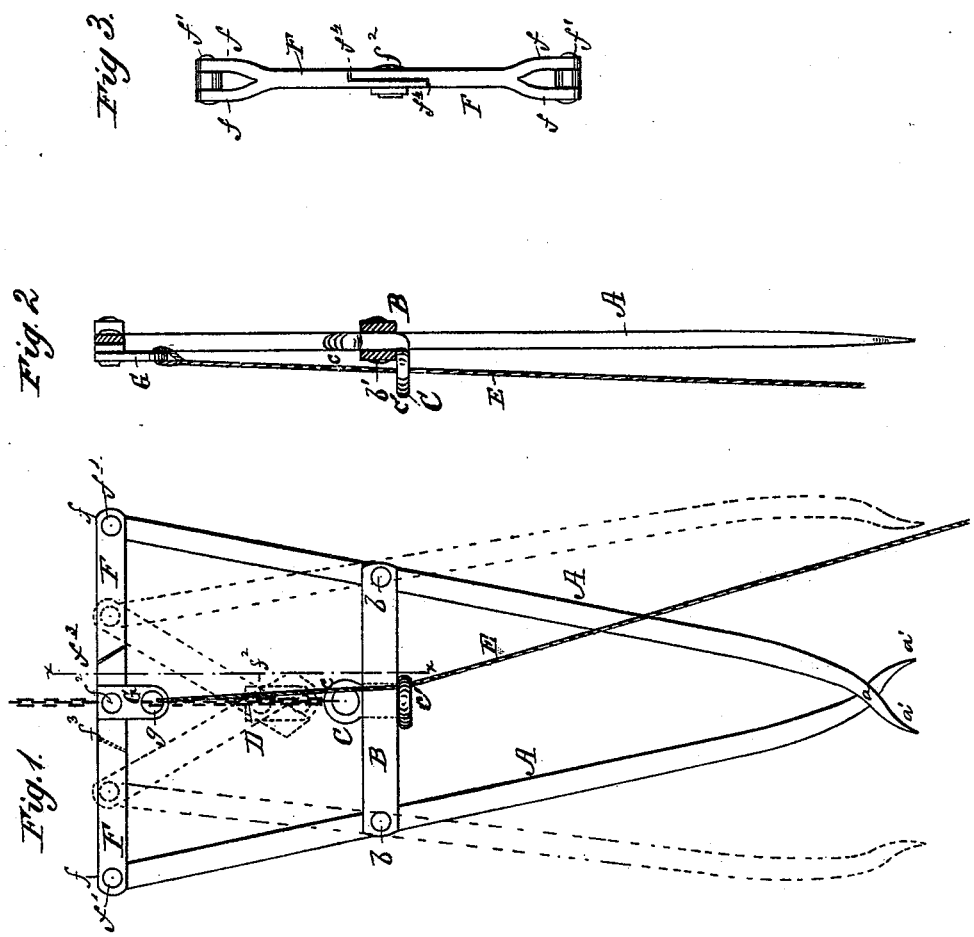
WITNESSES:
W. W. Hollingsworth
Geo. E. Kernon
INVENTOR:
Wm Andrews
BY
ATTORNEYS.

UNITED STATES PATENT OFFICE.

WILLIAM ANDREWS, OF BUFFALO GROVE, IOWA.

HORSE HAY-FORK.

SPECIFICATION forming part of Letters Patent No. 253,657, dated February 14, 1882.

Application filed October 12, 1881. (No model.)

*To all whom it may concern:*

Be it known that I, WM. ANDREWS, of Buffalo Grove, in the county of Buchanan and State of Iowa, have invented a new and useful Improvement in Hay-Forks; and I do hereby declare the following to be a full, clear, and exact description of the same, reference being had to the accompanying drawings, forming a part of this specification, in which—

Figure 1 is a side elevation. Fig. 2 is a sectional view on line $x$ $x$, Fig. 1. Fig. 3 is a plan view.

My invention relates to improvements in horse hay-forks; and it consists in the peculiar construction and arrangement of the parts, as hereinafter set forth, and pointed out in the claim.

In the drawings, A A represent the fork-tines, which are levers fulcrumed between the cross-bars B B on the pins or rivets $b$ $b$, arranged near the ends. These bars B B also hold at their middle by a rivet, $b'$, the intermediate bar, C, having the end rings, $c$ $c'$, of which the first extends up above the cross-bars in a vertical position and has the chain or lift-rope D fastened to it, while the lower ring is bent out in a horizontal plane to form a guide for the trip-rope E.

At the upper end of each tine A is an arm, F, between whose bifurcations $f$ $f$ the end of the tine is held on a rivet, $f'$, the arms themselves being thus pivoted to the tines. The inner end of each arm is rabbeted, end-beveled, provided with a beveled shoulder, and jointed on a rivet, $f^2$, which also secures to the arms a small plate, G, having the aperture $g$ for the trip-rope. The end bevels, $f^3$ $f^3$, on the arms F F are arranged in opposite directions, as well as the beveled shoulders $f^4$ $f^4$, whereby the arms can be carried upward until they are aligned, but no farther. The tines A A are curved at $a$ toward each other and bent at the ends to form the nearly or quite straight points $a'$.

The operation is as follows: The arms F F are drawn in between the short arms of the tines to bring the fork into the form shown in dotted lines, Fig. 1, of the drawings. The points $a'$ $a'$ are then pushed into the hay by pressing with the foot upon the cross-bars B, when the curves $a$ on the ends of the tines cause the points $a'$ to tend inwardly. The operator still presses with his foot on the cross-bars, and raises the arms F F until they are in alignment. The tines are now securely locked in the hay, because the outward pressure of the compressed hay upon the points holds the arms braced against one another. The chain or rope D is now operated in the usual way to lift the fork, which is then swung over the place on which the hay is to be dropped, when the trip-rope E is pulled by the operator. This has the effect of drawing down the arms F F, drawing the short arms of the tine-levers inwardly, and causing the points to unclasp and let go the hay.

By the above-described construction of horse hay-forks the number of parts employed is few, thereby simplifying and cheapening the construction and rendering it lighter and less liable to get out of order.

Having thus described all that is necessary to a full understanding of my invention, what I claim as new is—

The combination, with the transverse bars B B and bar C, secured between them, and provided with the end rings, $c$ $c'$, of the tines A, pivoted between said transverse bars, bifurcated arms F F, pivoted to the upper ends of the tines at their outer ends, and to each other at their inner ends, and each provided with oppositely-inclined inner ends, $f^3$, and recesses having oppositely-inclined shoulders $f^4$, and trip-plate G, pivoted to the toggle-arms by the same pin that pivots the toggles together, substantially as described.

WILLIAM ANDREWS.

Witnesses:
W. B. HALLECK,
C. E. COLE.